Figure 3:
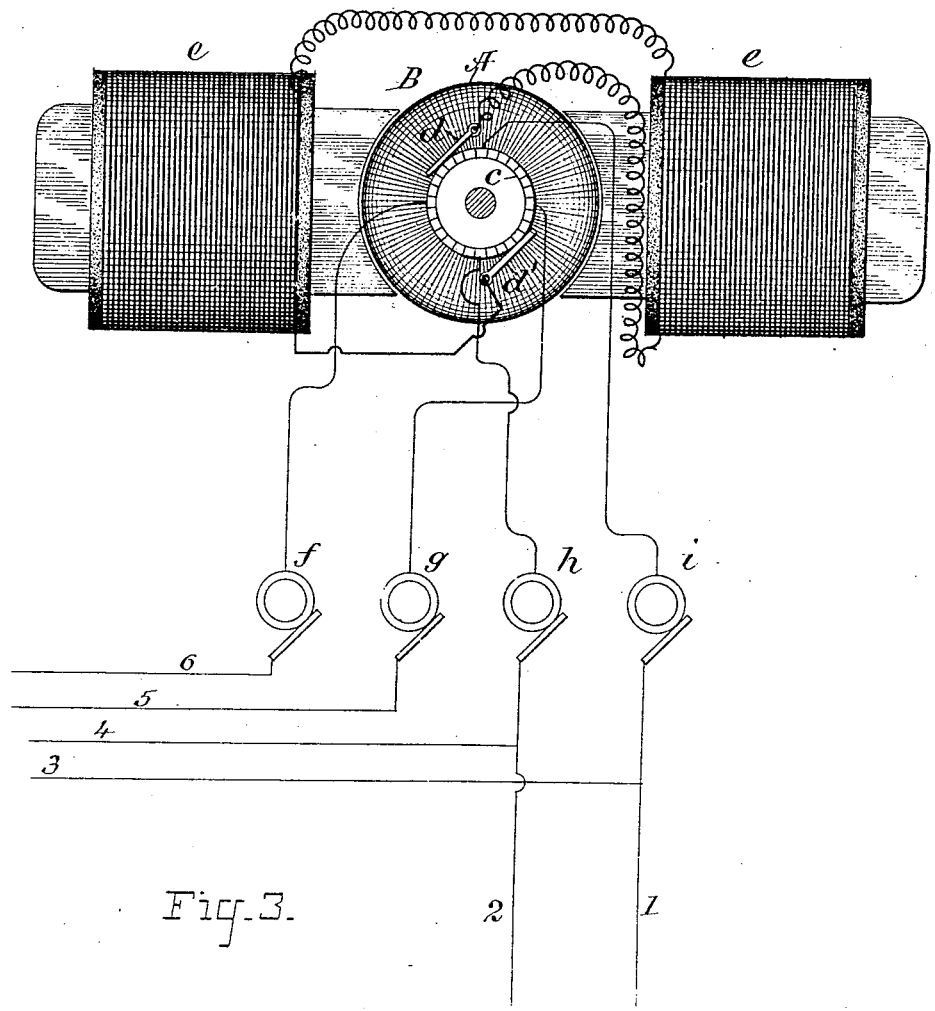

(No Model.) 2 Sheets—Sheet 1.
C. S. BRADLEY.
SYSTEM OF ELECTRICAL DISTRIBUTION.
No. 409,449. Patented Aug. 20, 1889.
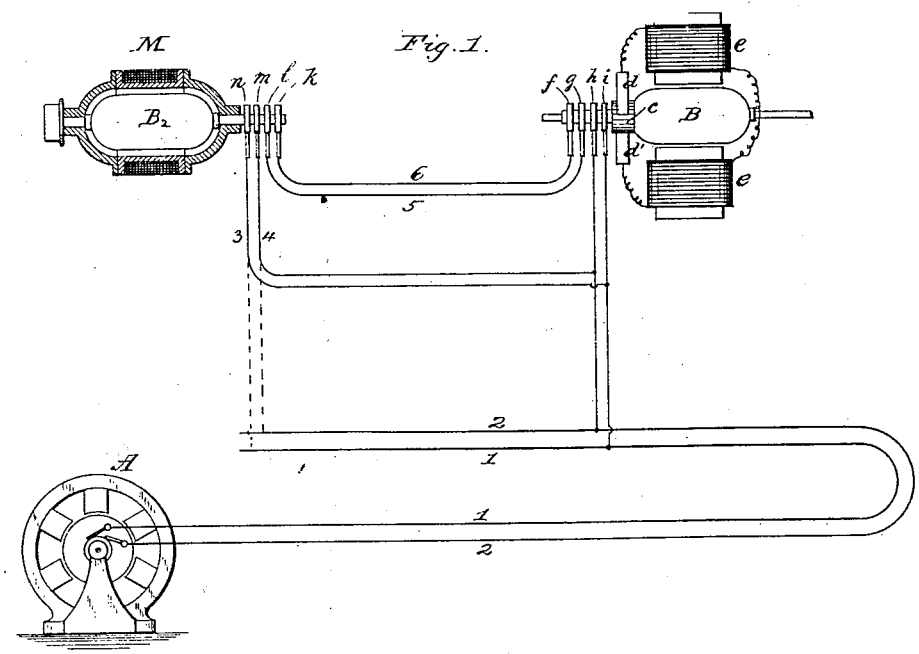
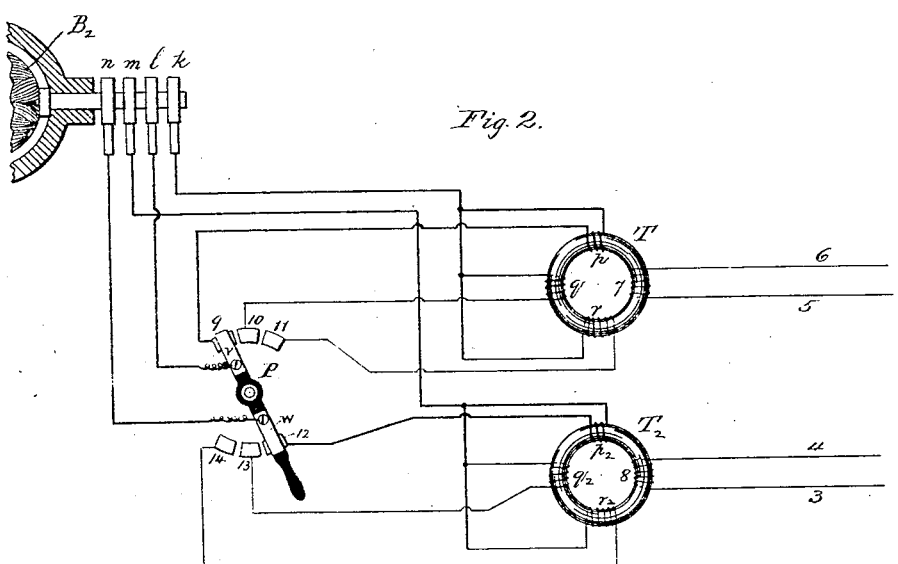
WITNESSES:
INVENTOR.
Charles S. Bradley
BY
McTighe & Worthington
ATTORNEYS (No Model.)　　　　　　C. S. BRADLEY.　　　2 Sheets—Sheet 2.
SYSTEM OF ELECTRICAL DISTRIBUTION.

No. 409,449.　　　　　　　　Patented Aug. 20, 1889.

UNITED STATES PATENT OFFICE.

CHARLES S. BRADLEY, OF YONKERS, NEW YORK.

SYSTEM OF ELECTRICAL DISTRIBUTION.

SPECIFICATION forming part of Letters Patent No. 409,449, dated August 20, 1889.

Application filed October 5, 1888. Serial No. 287,320. (No model.)

*To all whom it may concern:*

Be it known that I, CHARLES S. BRADLEY, a citizen of the United States, residing at Yonkers, in the county of Westchester and State of New York, have invented certain new and useful Improvements in Systems of Electrical Distribution; and I do hereby declare the following to be a full, clear, and exact description of the invention, such as will enable others skilled in the art to which it appertains to make and use the same.

This invention relates to a new system of electrical distribution by alternating currents, and while adapted for use in connection with electric-lighting appliances it is more particularly intended for the transmission of power over the ordinary alternating-current circuits, which under my system will be branched to supply motors of the alternating-current type. In Letters Patent No. 390,439, issued to me October 2, 1888, I have shown and described an electric motor of a type which may be described as a "differential-phase" motor, which is fed by two alternating currents, one of which is substantially a quarter-phase behind the other in its time period, and it is to such general type of motor that the present invention is more especially applicable.

My invention consists in a system comprising an alternating-current generator, a pair of mains extending therefrom, one or more quarter-phase electric motors, each having two supply-circuits, whether open or closed, one circuit being direct from the mains and the other circuit passing through an electromotive device adapted to receive the line-current and change its phase so that the currents eventually reaching the motor will be a quarter-phase apart, although but a single generator is used and a single pair of mains.

The invention further comprises a means of regulating such a motor; and it consists also in the combination and arrangement of devices, all substantially as hereinafter fully described and claimed.

In the drawings which form part of this specification, Figure 1 is a diagram illustrating one of the simplest forms of my system, and Fig. 2 illustrates the means of regulating the quarter-phase motor. Fig. 3 is an end elevation of the armature B in detail, showing the arrangement of its circuits.

A represents the generator of alternating currents, and 1 2 are the distributing-mains extending therefrom in any desired direction. B represents the armature of what I term the "local-phase" changer, and in the figure the armature B is a simple drum-armature with rectifying-commutator $c$, on which bear the brushes $d\ d'$, and these are respectively connected to the terminals of the field-magnets $e$. On the shaft of armature B, but insulated from the same and from each other, are four contact-rings $f\ g\ h\ i$, and of these the adjoining pairs $f\ g$ and $h\ i$ are respectively connected to diametrical points of the commutator $c$, and therefore are connected into the armature-circuit—that is to say, rings $h\ i$ are connected, respectively, to two opposite points, and rings $f\ g$ are respectively connected to two other opposite points which stand at right angles to the former.

As described in my previous patent, No. 390,439, it is obvious that the alternating current taken from the mains 1 2 into the rings $h\ i$ will pass into the armature B and set the same in rotation, part of the current being rectified by the commutator $c$, so as to maintain a strong field. The current then passes out through the rings $f\ g$, and on the way has its time period or phase altered—that is to say, it has been retarded one-fourth of a wave length.

At a point conveniently located in proximity to the described phase-changing apparatus I place the electric motor M, and its armature $B^2$ is similar to armature B, with the exception that it has no rectifying-commutator; but it is provided with rings $k\ l\ m\ n$, which are connected into the armature circuit of the armature $B^2$ in exactly the same manner as the rings $f\ g\ h\ i$ are connected into the circuit of armature B, and obviously, if we can supply the motor-armature $B^2$ with two currents differing by a quarter-phase in their time-period, the motor will operate successfully and with facility. From the branch supplying current from the mains 1 2 to the rings $h\ i$ of the armature B, or from the mains 1 2 directly, I take the branch 3 4 and lead it to the rings $m\ n$ of the armature $B^2$, so that the currents supplied to the said rings $m\ n$ is that circulating on the mains 1 2. From the contact-rings $f\ g$, I carry a pair of leads 5 6 to the rings $k\,l$, and as the current which has passed through armature B has had its phase retarded one-quarter of a period it is obvious that the motor-armature $B^2$ will be thereafter continuously supplied with two currents, one of which will be one-fourth phase behind the other in time period.

Any number of such motors and phase-changing devices can be connected to the main circuit 1 2, and at the same time a portion of the current flowing through the mains can be used for electric lighting or any other desired purpose. I have shown the phase-changing device as substantially the same size as the motor, but this merely for the purpose of making clear its functions. In practice, however, since the armature B has no work to do except overcome its own friction and inertia and change the phase of the current, it may be very small, irrespective altogether of the size of the motor which it may be desired to use at any particular point, and therefore the phase-changing devices used throughout a system of distribution of this character may be all uniform, and being very small can be set to work in out-of-the-way places, where they will not be interfered with.

In many cases where electric motors are used it is very desirable to be able to control their power or speed, or both. I have devised means of doing this in connection with the above system and have illustrated it graphically in Fig. 2. In this figure the two circuits 5 6 and 3 4—one carrying a current a quarter-phase behind that carried by the other—are respectively connected to the primary coils 7 and 8 of the converters or transformers $T\,T^2$. Each of these converters is in addition provided with three secondary coils, respectively marked $p\,q\,r$ and $p^2\,q^2\,r^2$. The coils $p\,p^2$ are exactly alike and are made with only a few turns, in order to have induced in them a very low electro-motive force. The coils $q\,q^2$ are given a few more turns, so as to have induced in them a somewhat higher electro-motive force than that induced in the coils $p\,p^2$. The coils $r\,r^2$ are wound with more turns still, so as to have induced in them currents whose electro-motive force will be substantially equal to that flowing in the branches 3 4 and 5 6.

I have herein described the transformers $T\,T^2$ as being provided with three secondaries; but I wish to state that if a wider range of adjustment is desirable the number of secondaries can be increased to any required extent, and the difference between them may be according to circumstances of use. I arrange these secondaries in connection with a switching device in such manner that I can connect the terminals of any two corresponding secondary coils into the rings $k\,l\,m\,n$ of the motor-armature $B^2$. This switch may be of any desired construction capable of doing the work; but I show a particular form arranged to do the double switching of each pair of coils simultaneously. This switch consists of a pivoted bar P, carrying metallic contact-arms $r\,w$, and in the path of the arms I arrange the respective contacts 9 10 11 and 12 13 14. The ring $k$ of the motor-armature is directly connected to the corresponding terminal of each of the secondary coils $p\,q\,r$, and the ring $m$ is likewise directly connected to the corresponding terminals of the secondary coils $p^2\,q^2\,r^2$. The remaining terminals of the coils $p\,q\,r$ are respectively carried out to the contacts 9 10 11 of the switch, and the similar remaining terminals of the coils $p^2\,q^2\,r^2$ of the transformer $T^2$ are carried out to the switch-contacts 12 13 14. The remaining rings $l$ and $n$ are joined by flexible connections to the contacts $v$ and $w$ of the switch-arm P. Thus arranged each of the transformers $T\,T^2$ operates independently of the other. So far there will be no conflict, owing to the fact that the currents in the circuit 5 6 are one quarter-phase behind the currents in the circuit 3 4.

Supposing, now, the motor-armature $B^2$ is at rest and the switch-bar P is not resting upon any of the contacts, none of the secondary circuits of either of the transformers is closed, and consequently no work will be done under these conditions. If, now, we want to start the motor, I swing the arm P into contact with the points 9 and 12 of the switch. This at once closes the circuit of secondary coil $p$ into the armature $B^2$ through the contact-rings $k\,l$, and at the same instant it likewise closes the circuit of the secondary coil $p^2$ into the armature $B^2$ through the contact-rings $m\,n$, since in the transformation which takes place, if any retardation of phase occurs in the secondary currents, the secondary coils in both transformers will be affected in the same degree and will have the same time relation to each other as the currents in the primary coils, and it follows from the foregoing that the armature $B^2$ will now be supplied by the converted currents under the same conditions of difference of time-period in the supply-circuit of the motor, and consequently the latter will be operated as before. If it is desired to give the motor more electro-motive force, I swing the switch-bar P onto the contacts 10 and 13, and now the coils $q\,q^2$ receive the inductive effect and supply the resulting electro-motive force to the armature $B^2$.

Should it be desired to provide the armature with an electro-motive force still higher, I swing the bar P onto the contacts 11 and 14, and now the inductive effect is produced through the secondary coils $r\,r^2$. By suitable construction of the secondary coils of the transformers $T\,T^2$, I can supply the motor-armature $B^2$ with any electro-motive force which may be desired, whether the same be below or above that of the primary circuits, and thus I can effect any condition of current which may be required in any particular case.

I claim as my invention—

1. In a system of electrical distribution, the combination of a generator of alternating currents, a pair of mains connected thereto, one or more multiple-circuit differential-phase electric motors having one circuit connected directly to said mains and the other circuit or circuits connected to said mains through an interposed electro-motive phase-changing device adapted to change the time-period of the currents passing through it.

2. In a system of electrical distribution, the combination of a generator of alternating currents, a pair of mains connected thereto, one or more double-circuit quarter-phase electric motors having one circuit connected directly to said mains and the other circuit connected to the said mains through an interposed electro-motive device adapted to change currents passing through it at one-quarter of a phase or wave length.

3. The combination, with a quarter-phase double-circuit electric motor, of two transformers, each composed of a primary coil connected to the supply-circuit, and two or more graduated secondary coils connected to the motor-circuit, and means for switching said secondaries in matched pairs into the motor-circuits, substantially as described.

4. The combination, with an alternating-current double-circuit electric motor, of one or more transformers having primary coils connected to supply-circuits, and two or more graduated secondary coils adapted to be connected to the motor-circuits, and means for connecting said secondary coils into the motor-circuits as required, substantially as described.

5. The combination, with a multiple-circuit alternating-current electric motor, of two or more supply-circuits having their currents of respectively differing phase, two or more primary or inducing coils respectively included in the supply-circuits, two or more graduated sets of secondary coils in inductive relation to said primary coils, and a switch adapted to connect the respective motor-circuits to any pair of said secondary coils.

In testimony whereof I affix my signature in presence of two witnesses.

CHARLES S. BRADLEY.

Witnesses:
T. J. McTighe,
Anthony Hollis.